United States Patent
Duke et al.

(10) Patent No.: US 9,821,901 B2
(45) Date of Patent: Nov. 21, 2017

(54) SYSTEM AND METHOD FOR ELECTRONIC PROPELLER BLADE ANGLE POSITION FEEDBACK

(71) Applicant: PRATT & WHITNEY CANADA CORP., Longueuil (CA)

(72) Inventors: Brant Duke, Lasalle (CA); James Robert Jarvo, St-Bruno (CA); Michael Mark, Montreal (CA); Mario Guerra, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 439 days.

(21) Appl. No.: 14/546,252

(22) Filed: Nov. 18, 2014

(65) Prior Publication Data
US 2015/0139798 A1 May 21, 2015

Related U.S. Application Data

(60) Provisional application No. 61/907,246, filed on Nov. 21, 2013.

(51) Int. Cl.
*B64C 11/30* (2006.01)
*B64D 45/00* (2006.01)
(Continued)

(52) U.S. Cl.
CPC ............ *B64C 11/301* (2013.01); *B64D 45/00* (2013.01); *F01D 7/00* (2013.01); *G01P 3/487* (2013.01);
(Continued)

(58) Field of Classification Search
CPC ....... B64D 45/00; B64C 11/301; B64C 27/04; B64C 11/305; B64C 11/40; B64C 11/48;
(Continued)

(56) References Cited

U.S. PATENT DOCUMENTS 4,934,825 A  6/1990 Martin
4,948,337 A  8/1990 Martin et al.
(Continued)

FOREIGN PATENT DOCUMENTS

EP  0353076 A2  1/1990
GB  2346701 A  8/2000
GB  2465575 A  5/2010

OTHER PUBLICATIONS

Jones et al., Preliminary Design of Sliding Mode Controller for Angular Positional Tracking of an Aircraft, 2009, IEEE, p. 483-488.*

*Primary Examiner* — McDieunel Marc
(74) *Attorney, Agent, or Firm* — Norton Rose Fulbright Canada LLP (57) ABSTRACT

A system and method for blade angle position feedback. The system comprises an annular member operatively connected to rotate with a propeller, a sensor fixedly mounted adjacent the annular member and configured for detecting a passage of each singularity as the annular member is rotated and axially displaced and for generating a sensor signal accordingly, the annular member and sensor configured for relative axial displacement between a first relative axial position and a second relative axial position respectively corresponding to the first and the second mode of operation, and a detection unit connected to the sensor for receiving the sensor signal therefrom, determining on the basis of the sensor signal a time interval elapsed between the passage of successive singularities, and computing from the time interval blade angle position.

20 Claims, 7 Drawing Sheets

US 9,821,901 B2

Page 2

(51) Int. Cl.
    *F01D 7/00* (2006.01)
    *G01P 3/487* (2006.01)
    *G01P 3/488* (2006.01)
    *B64C 11/06* (2006.01)
    *G01D 5/14* (2006.01)
    *G01D 5/245* (2006.01)

(52) U.S. Cl.
    CPC .............. *G01P 3/488* (2013.01); *B64C 11/06* (2013.01); *G01D 5/145* (2013.01); *G01D 5/2451* (2013.01)

(58) Field of Classification Search
    CPC . B64C 27/26; B64C 11/44; F01D 7/00; F02D 29/02; G01P 3/487; G01P 3/488; G01D 5/145; G01D 5/2451
    USPC ............................................................ 701/3
    See application file for complete search history.

(56) References Cited

U.S. PATENT DOCUMENTS

| 5,174,718 | A | | 12/1992 | Lampeter et al. | |
|---|---|---|---|---|---|
| 5,209,640 | A | * | 5/1993 | Moriya | B64C 11/40 416/27 |
| 5,284,418 | A | * | 2/1994 | Moriya | B64C 11/44 416/35 |
| 5,299,911 | A | * | 4/1994 | Moriya | B64C 11/44 416/35 |
| 5,715,162 | A | | 2/1998 | Daigle | |
| 5,865,599 | A | | 2/1999 | Pruden et al. | |
| 5,997,250 | A | * | 12/1999 | Carter, Jr. | B64C 11/40 416/1 |
| 6,004,098 | A | * | 12/1999 | Chevallier | F02D 29/02 416/157 R |
| 6,224,021 | B1 | * | 5/2001 | Tanaka | B64C 11/305 244/221 |
| 7,281,482 | B1 | * | 10/2007 | Beauchamp | B63H 25/46 114/151 |
| 8,109,728 | B2 | | 2/2012 | Neitzke et al. | |
| 8,186,629 | B2 | * | 5/2012 | Queiras | B64C 27/26 244/17.13 |
| 8,465,257 | B1 | * | 6/2013 | Noble | B63H 3/008 416/167 |
| 8,549,833 | B2 | * | 10/2013 | Hyde | F02C 6/00 60/204 |
| 8,689,538 | B2 | * | 4/2014 | Sankrithi | B64C 11/48 60/226.1 |
| 9,216,820 | B2 | * | 12/2015 | Eglin | B64C 27/04 |
| 9,272,778 | B2 | * | 3/2016 | Eglin | B64C 27/04 |
| 2004/0018914 | A1 | | 1/2004 | Stolfus | |
| 2007/0110577 | A1 | | 5/2007 | Danielson | |
| 2013/0174533 | A1 | | 7/2013 | Ribarov et al. | |
| 2013/0304418 | A1 | | 11/2013 | Gendrich | |

* cited by examiner

SYSTEM AND METHOD FOR ELECTRONIC PROPELLER BLADE ANGLE POSITION FEEDBACK

CROSS-REFERENCE TO RELATED APPLICATIONS

This application claims priority of U.S. provisional application Ser. No. 61/907,246, filed on Nov. 21, 2013, the entire contents of which are incorporated by reference herein.

TECHNICAL FIELD

The application relates generally to propeller feedback systems for gas turbine engines and, more particularly, to systems and methods for blade angle position feedback.

BACKGROUND OF THE ART

On reversing propeller systems, it is desirable to accurately measure the propeller blade (or beta) angle. In this manner, it becomes possible to ensure that the blade angle is controlled according to the engine power set-point requested in reverse operation. Accurate measure of the blade angle also ensures that the propeller is not inadvertently commanded to transition into low or reverse beta angles, which would cause a potentially serious failure condition for the aircraft.

Current turboprop propeller feedback systems typically use a mechanical cam and cables to provide a variable hydraulic lockout mechanism to prevent the propeller from transitioning into a low or reverse beta position. However, a drawback of such systems is that they do not interface with modern electronic engine control systems.

There is therefore a need for an improved propeller feedback system.

SUMMARY

In one aspect, there is provided a blade angle position feedback system for an aircraft propeller, the propeller rotatable about an axis and comprising a plurality of blades each rotatable through a plurality of blade angles, the propeller having at least a first mode of operation where the plurality of blades are operated at a positive blade angle and a second mode of operation where the plurality of blades are operated at a negative blade angle. The system comprises an annular member operatively connected to rotate with the propeller, the annular member comprising at least two circumferentially-spaced first singularities extending substantially parallel to the axis and at least one second singularity extending non-parallel to the first singularities. The system also comprises at least one sensor fixedly mounted adjacent the annular member, the at least one sensor configured for successively detecting a passage of each one of the at least two first singularities and the at least one second singularity as the annular member is rotated and axially displaced and for generating a sensor signal accordingly. The annular member and at least one sensor are configured for relative axial displacement between a first relative axial position and a second relative axial position, the first position corresponding to the first mode of operation and the second position corresponding to the second mode of operation. The system also comprises a detection unit connected to the at least one sensor for receiving the sensor signal therefrom, determining on the basis of the sensor signal a time interval elapsed between the passage of successive ones of the at least two first singularities and the at least one second singularity, and computing from the time interval a blade angle position for the plurality of blades.

In another aspect, there is provided an aircraft propeller system comprising a propeller having a plurality of blades each rotatable from a positive blade angle to a negative blade angle, an annular member comprising circumferentially-spaced first singularities each extending generally parallel and at least a second singularity extending non-parallel to the first singularities, a sensor adjacent the annular member and configured for detecting the singularities passing the sensor, the annular member and sensor slidingly mounted with respect to one another between first and second relative axial positions, one of the annular member and sensor mounted for rotation with the propeller and the other fixedly mounted to the engine, and a detection unit connected to the sensor and configured for computing a blade angle position based on elapsed time between detected singularities.

In a further aspect, there is provided a method for blade angle position feedback for an aircraft propeller, the propeller rotatable about an axis and comprising a plurality of blades each rotatable through a plurality of blade angles, the propeller having at least a first mode of operation where the plurality of blades are operated at a positive blade angle and a second mode of operation where the plurality of blades are operated at a negative blade angle. The method comprises receiving a sensor signal from at least one sensor fixedly mounted adjacent an annular member operatively connected to rotate with the propeller. The annular member comprises at least two circumferentially-spaced first singularities extending substantially parallel to the axis and at least one second singularity extending non-parallel to the first singularities. The at least one sensor is configured for successively detecting a passage of each one of the at least two first singularities and the at least one second singularity as the annular member is rotated and axially displaced and for generating a sensor signal accordingly. The annular member and at least one sensor are configured for relative axial displacement between a first relative axial position and a second relative axial position, the first position corresponding to the first mode of operation and the second position corresponding to the second mode of operation. The method further comprises determining on the basis of the sensor signal a time interval elapsed between the passage of successive ones of the at least two first singularities and the at least one second singularity, and computing from the time interval a blade angle position for the plurality of blades.

DESCRIPTION OF THE DRAWINGS

Reference is now made to the accompanying figures in which.

DETAILED DESCRIPTION

Figure 1:
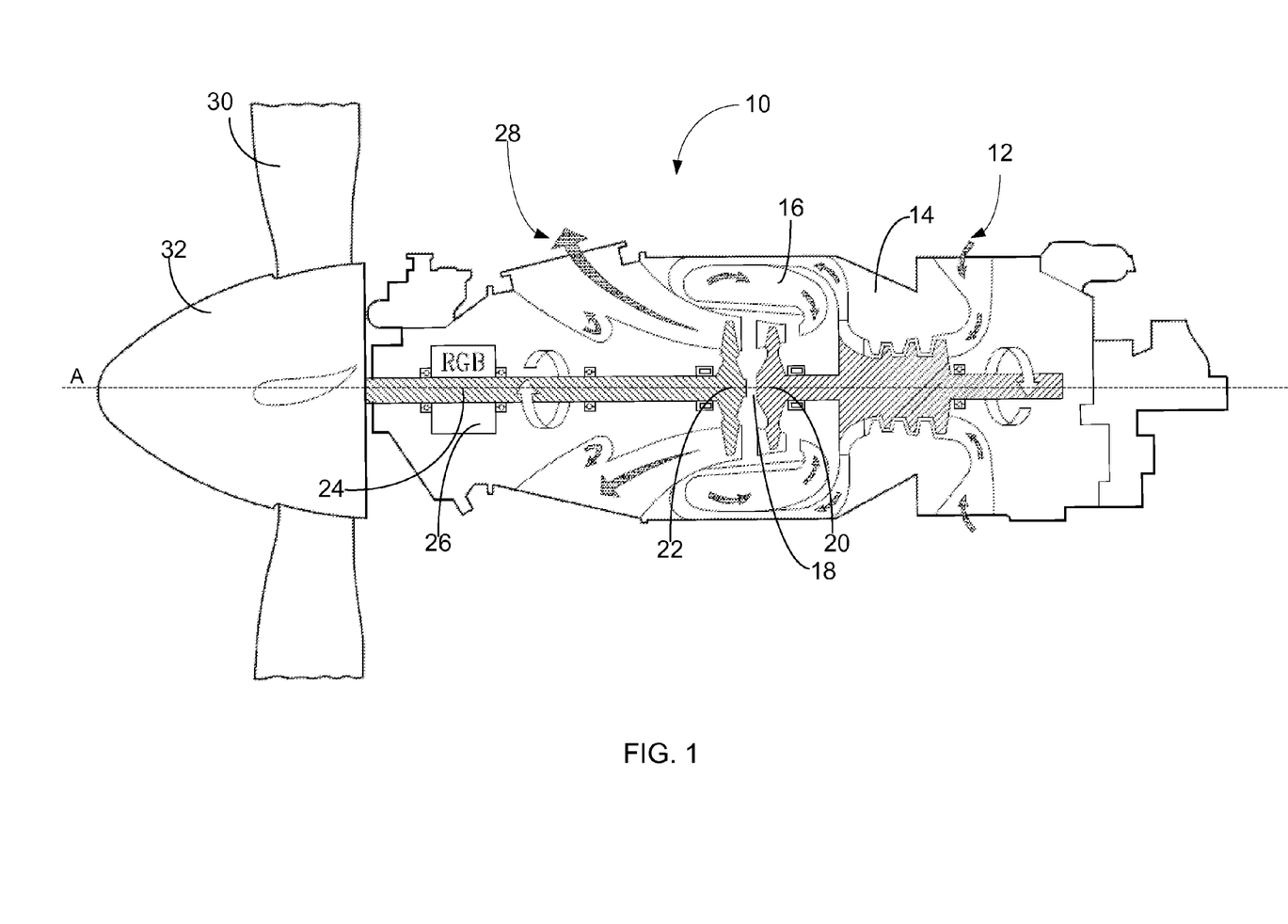
FIG. 1 is a schematic cross-sectional view of a gas turbine engine.

FIG. 1 illustrates a gas turbine engine 10, of a type typically provided for use in subsonic flight, comprising an inlet 12, through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The turbine section 18 illustratively comprises a compressor turbine 20, which drives the compressor assembly and accessories, and at least one power or free turbine 22, which is independent from the compressor turbine 20 and rotatingly drives a rotor shaft 24 about a propeller shaft axis A through a reduction gearbox 26. Hot gases may then be evacuated through exhaust stubs 28. The gas generator (not shown) of the engine 10 illustratively comprises the compressor section 14, the combustor 16, and the turbine section 18. A rotor 30, in the form of a propeller through which ambient air is propelled, is hosted in a propeller hub 32. Rotor 30 may, for example, comprise a propeller of a fixed-wing aircraft or a main (or tail) rotor of a rotary-wing aircraft such as a helicopter. The rotor 30 may comprise a plurality of circumferentially-arranged blades (not shown) connected to a hub (not shown) by any suitable means and extending radially therefrom. The blades are also each rotatable about their own radial axes through a plurality of blade angles, which can be changed to achieve modes of operation, such as feather, full reverse, and forward thrust.

Figure 2:
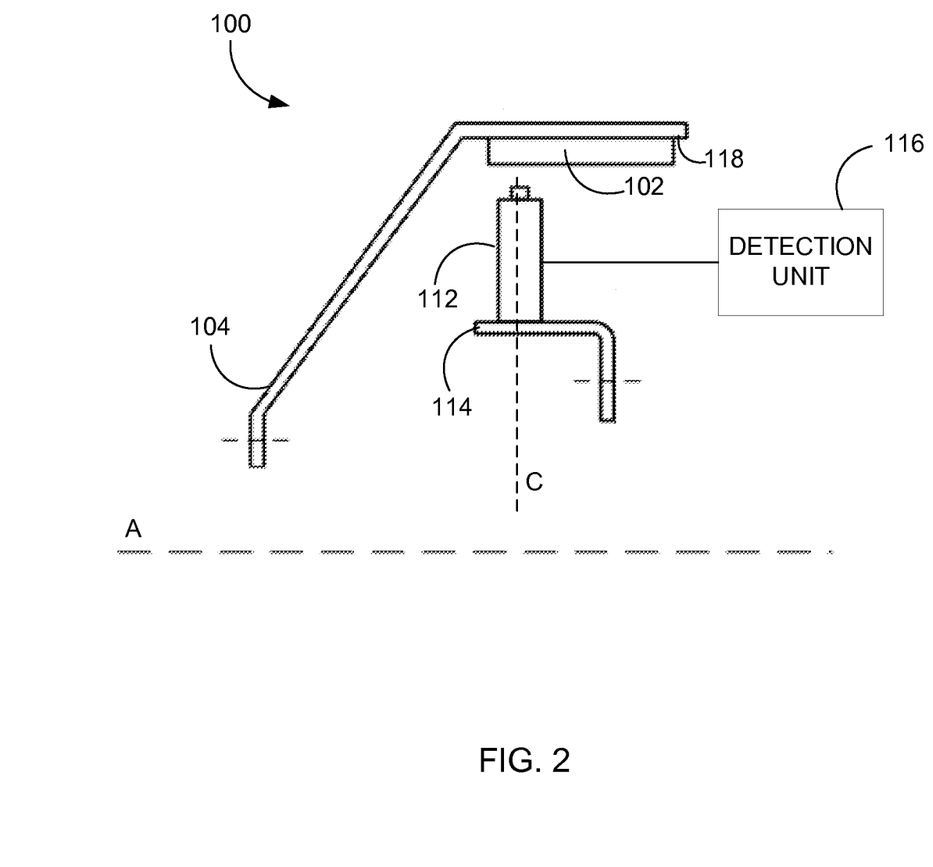
FIG. 2 is a schematic diagram of a system for electronic beta feedback detection, in accordance with an illustrative embodiment.

Referring to FIG. 2, an electronic beta feedback system 100 will now be described. The system 100 provides for accurate detection and measurement of propeller blade angle on propeller systems, such as the engine 10 of FIG. 1. The system 100 may interface to existing mechanical interfaces of typical propeller systems to provide a variable mark/space digital detection for electronic determination of the propeller blade angle.

Figure 3:
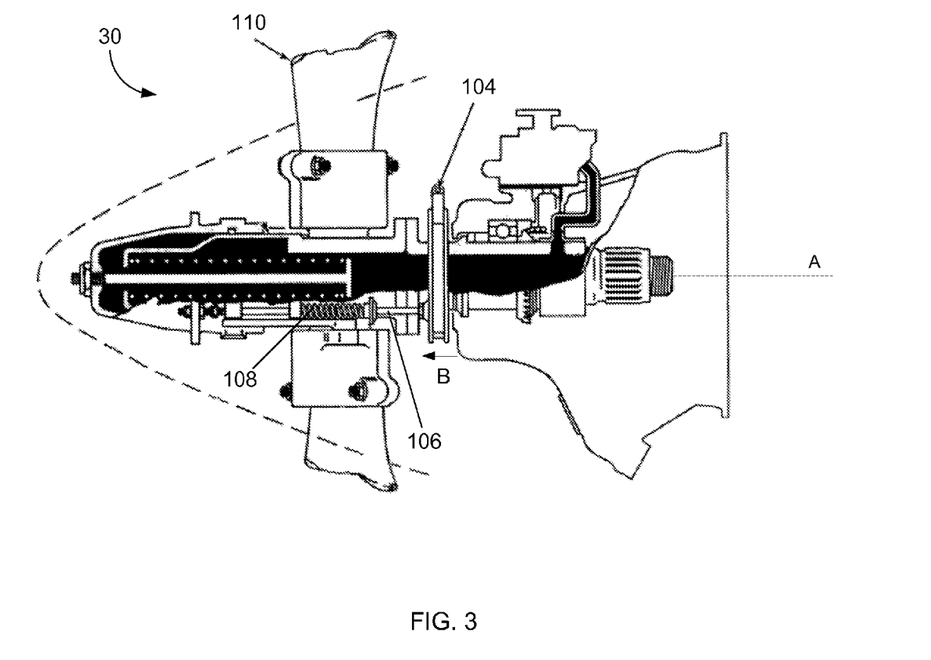
FIG. 3 is a schematic diagram of the propeller of FIG. 1 showing the feedback wheel of FIG. 2, in accordance with an illustrative embodiment.

The system 100 illustratively comprises a plurality of singularities as in 102 provided on an annular member 104 (referred to herein as a propeller beta feedback wheel) carried on the propeller 30. As can be seen in FIG. 3, the beta feedback wheel 104 is supported for rotation with the propeller 30, which rotates about an axis A. The beta feedback wheel 104 is also supported for axial sliding movement along the axis A, e.g. by support members, such as a series of circumferentially spaced beta feedback rods 106 that extend along the axis A. A compression spring 108 surrounds an end portion of each rod 106 such that a force exerted by the compression springs 108 (e.g. in response to shifting of the propeller's blades 110 to a reverse pitch position) causes axial movement of the rods 106, and accordingly of the feedback wheel 104, along axis A in the direction of arrow B. Indeed, the propeller 30 comprises a plurality of angularly arranged blades as in 110 each rotatable about the axis A through a plurality of adjustable blade angles, the blade angle being the angle between the chord line (i.e. a line drawn between the leading and trailing edges of the blade) of the propeller blade section and a plane perpendicular to the axis of propeller rotation. The propeller 30 may be a reversing propeller 30 having a plurality of modes of operation, such as feather, full reverse, and forward thrust. In some modes of operations, such as feather, the blade angle is positive. The propeller 30 may be operated in a reverse mode where the blade angle is negative.

Referring back to FIG. 2, the feedback wheel 104 is illustratively used to provide blade (or beta) angle position feedback. During rotation of the propeller (reference 30 in FIG. 3), the plurality of singularities as in 102 rotate with the feedback wheel 104 about the axis of rotation A and their passage is detected by at least one sensor 112 provided in a fixed relationship relative to the rotating propeller components. The sensor 112 may be any sensor (e.g. a speed transducer) configured to continuously detect passage of the singularities as in 102 during rotation of the propeller 30. In one embodiment, the sensor 112 is an electrically robust and environmentally sealed non-contact sensor suited for harsh environments and offering superior reliability. The sensor 112 may be any suitable inductive sensor having a varying reluctance or a Hall effect. In one embodiment, the sensor 112 is implemented as a transducer comprising a coil wound around a permanent magnet (not shown). The singularities $102_A$, $102_B$, $102_C$ may then be made of a magnetically conductive material, e.g. a ferrous metal, to enable the sensor 112 to detect the passage thereof.

The sensor 112 is illustratively mounted to a flange 114 of the propeller housing (not shown) so as to be positioned adjacent the plurality of singularities as in 102. In particular, the sensor 112 is illustratively secured to the propeller 30 so as to extend away from the flange 114 (and towards the singularities 102) along a direction C substantially transverse to the axis of rotation A. In one embodiment, a single sensor 112 is mounted in close proximity to the beta feedback wheel 104 and the singularities 102. In another embodiment, in order to provide loss of probe protection, two (2) sensors as in 112 may be mounted in a diametrically opposite relationship relative to the singularities 102, which illustratively extend away from the feedback wheel 104 and towards the sensor(s) 112. In yet another embodiment, several singularities 102 may be spaced equiangularly about the perimeter of the feedback wheel 104. Other embodiments may apply.

A detection unit 116 is illustratively electrically connected to the sensor(s) 112 and configured to receive output signal(s) therefrom, the output signal(s) generated upon the sensor(s) 112 detecting the passage of a given singularity as in 102 adjacent thereto, as will be discussed further below. The detection unit 116 is illustratively part of the Engine Electronic Control (EEC, not shown) and is configured to provide, on the basis of the signal(s) received from the sensor(s) 112, a blade angle position feedback for the propeller (reference 30 in FIG. 3), as will be discussed further below. For this purpose, the detection unit 116 may comprise one or more computing devices including, but not limited to, a digital computer, a processor (e.g. a microprocessor), and a memory. The detection unit 116 may further determine from the received output signal(s) the rotational speed of the propeller 30 as well as achieve synchrophasing and synchronization. Other applications will be readily understood by a person skilled in the art.

Figure 4:
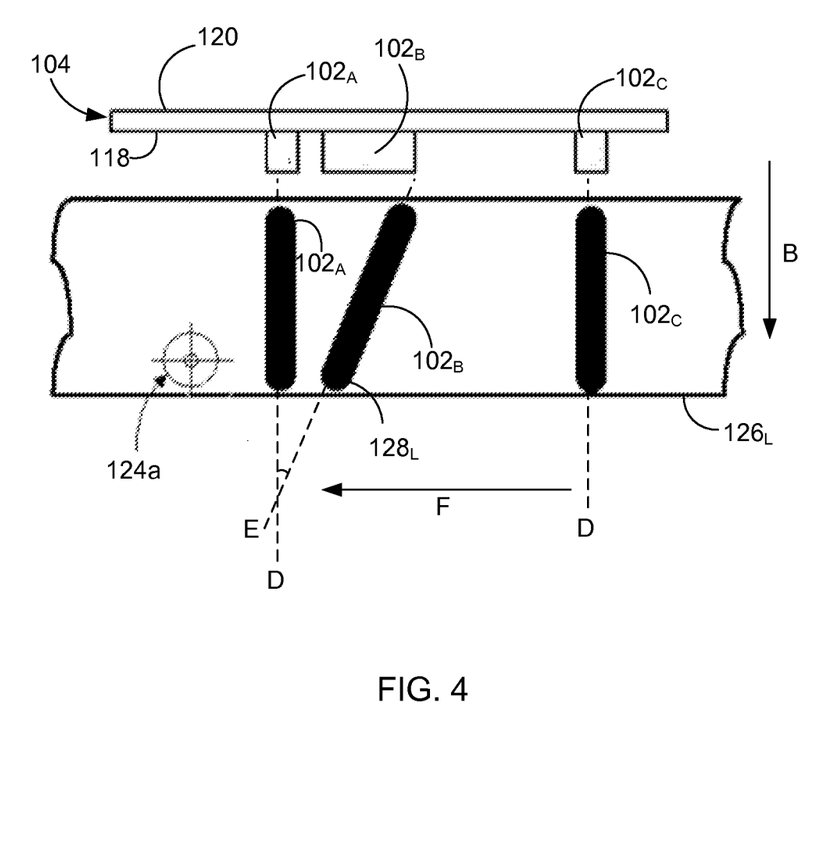
FIG. 4 illustrates the arrangement of FIG. 2 taken along view A rotated by ninety degrees, with the propeller in a start position, in accordance with an illustrative embodiment.

As shown in FIG. 4, in one embodiment, the singularities 102 comprise a plurality of spaced protrusions or teeth mounted (using any suitable attachment means, such as screws, bolts, and the like) to an inner face 118 of the feedback wheel 104. A first set of teeth, illustratively at least two first teeth as in $102_A$ and $102_C$, and at least one second tooth, which is referred to herein as a detection tooth $102_B$, are provided, with the detection tooth $102_B$ being positioned between two consecutive ones of the first teeth as in $102_A$ and $102_C$. In one embodiment, a total of three (3) teeth $102_A$, $102_B$, $102_C$, is provided about the perimeter of the feedback wheel 104, as illustrated. It should however be understood that more than three (3) teeth may be provided. In particular, more than one detection tooth as in $102_B$ may be provided for propeller phase detection (e.g. to implement missing tooth detection, as discussed further below) and to maintain operation of the system. The number of teeth in turn drives the size of the digital counters provided in the detection unit (as discussed further below).

Each first tooth as in $102_A$ or $102_C$ is illustratively positioned along a direction D, which is substantially parallel to the axis A. The detection tooth $102_B$ is positioned along a direction E angled to the direction D, such that the tooth $102_B$ is offset relative to the teeth $102_A$ and $102_C$. A range of angles may be used to design the detection tooth $102_B$. The angle between directions E and D may be selected based on optimization of development test data and may include compound angles, e.g. angles comprising a first component providing a radial component and a second component providing a tangential component. Illustratively, the angle between directions E and D is between 0.1 and 89.9 degrees. In one preferred embodiment, the angle is set to 45 degrees so as to maximize the signal change (as detected by the sensor 112 in FIG. 2) for a given axial movement of the propeller (reference 30 in FIG. 3) resulting from the offset of tooth $102_B$ relative to teeth $102_A$ and $102_C$. Other embodiments may apply.

As illustrated in FIG. 2, each sensor 112 may be mounted to the flange 114 adjacent the inner face 118 of the feedback wheel 104, i.e. inside the feedback wheel 104. In an alternate embodiment, the teeth $102_A$, $102_B$, $102_C$ may be mounted to (e.g. extend away from) an outer face 120 of the beta feedback wheel 104 and each sensor 112 may accordingly be positioned adjacent the outer face 120, about a perimeter of the feedback wheel 104. In yet another embodiment, the singularities may comprise slots (not shown) rather than teeth, with the slots being formed or otherwise machined in the feedback wheel 104 and made of a magnetically conductive material, e.g. a ferrous metal. It should be understood that the number of singularities as in $102_A$, $102_B$, $102_C$ of the beta feedback wheel 104 may be adjusted according to the desired application. For instance, the number of singularities as in $102_A$, $102_B$, $102_C$ may be increased to provide low speed detection frequency for the EEC.

Figure 5:
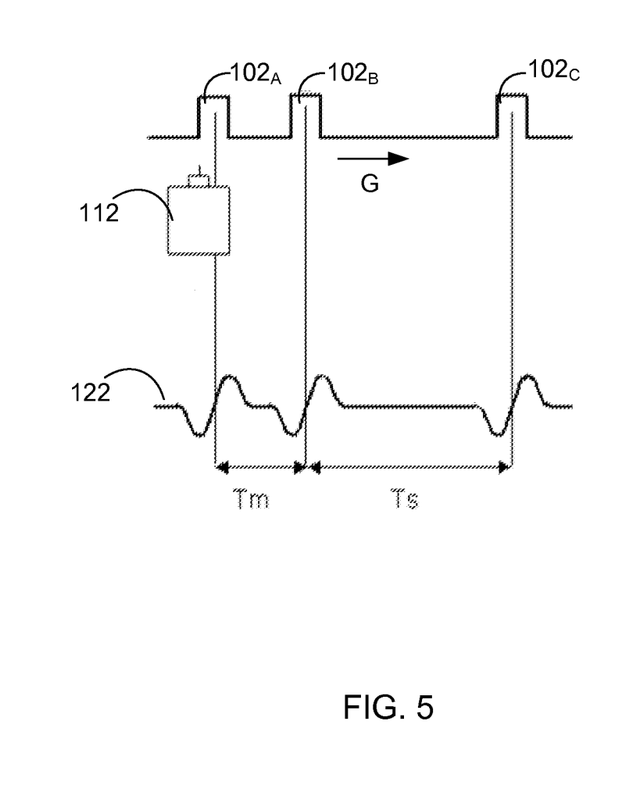
FIG. 5 is a schematic diagram illustrating operation of a beta position transducer, in accordance with an illustrative embodiment.

Referring now to FIG. 5 in addition to FIG. 4, in operation, the feedback wheel 104 rotates (e.g. in the direction of arrow F) during rotation of the propeller (reference 30 in FIG. 3). The sensor 112 then detects the passage of each one of the singularities $102_A$, $102_B$, $102_C$ and accordingly generates an output voltage signal (also referred to herein as a variable mark/space signal), illustrated by waveform 122 in FIG. 5. In particular, as the singularities $102_A$, $102_B$, $102_C$ are displaced by movement of the propeller 30, each one of the singularities (e.g. singularity $102_A$) approaches the sensor 112. This changes the sensor's reluctance and causes a magnetic field to be generated and current to flow in the sensor's coil. An increase in the sensor's output voltage signal 122 (e.g. a single pulse causing a positive voltage transition) is then produced. When the given singularity (e.g. singularity $102_A$) moves away from the sensor 112, the pulse shape is inverted and the sensor's output voltage signal 122 is returned to zero.

The sensor's output voltage signal 122 is received at the detection unit 116, which continuously monitors the signal to detect the positive transition of the voltage waveform.

When such a positive transition is detected, the detection unit 116 accordingly determines that the increase in voltage corresponds to detection by the sensor 112 of passage of a singularity (e.g. singularity $102_A$). A digital counter (not shown), such as a free-running 20 MHz counter, provided in the detection unit 116 starts counting the number of digital clock cycles until the next singularity (e.g. singularity $102_B$) is detected by the sensor 112, i.e. until the next positive transition in the output voltage 122. In particular, the counter determines the number of clock cycles between detection of passage of the first teeth $102_A$, $102_C$ and detection of passage of the detection tooth $102_B$ of the modified beta feedback wheel 104. The interval of time between the passage of the first tooth $102_A$ and the passage of the detection tooth $102_B$ is indicated as Tm while the interval of time between the passage of the detection tooth $102_B$ and the passage of the first tooth $102_C$ is indicated as Ts. The detected time intervals Tm and Ts are then stored in the memory for subsequent processing by the detection unit 116. As discussed above, the number of teeth as in $102_A$, $102_B$, $102_C$ limits the size and/or number of counters within the detection unit 116. In some embodiments, the size and/or number of the digital counters may be increased to provide low speed detection frequency for the EEC, assuming a fixed digital timebase within the detection unit 116. It should be understood that slowing the fixed digital timebase may also achieve low speed detection frequency but penalizes system accuracy.

Figure 6:
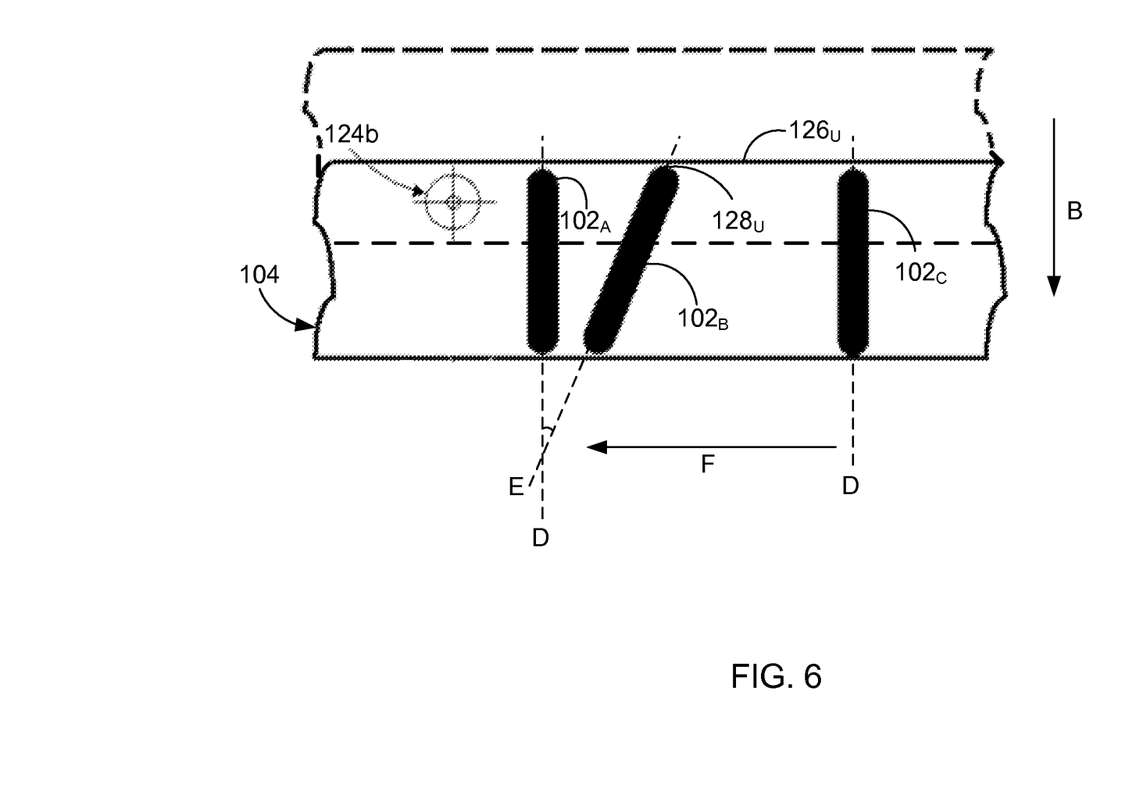
FIG. 6 illustrates the arrangement of FIG. 4 with the propeller in a fully reverse position, in accordance with an illustrative embodiment.

Referring now to FIG. 6 in addition to FIG. 4, the angled or offset positioning of the detection tooth $102_B$ results in the sensor 112 seeing different portions of the detection tooth $102_B$ as the propeller mode of operation is modified and the blade angle is varied. Indeed, in one embodiment, the propeller 30 is a reversing (or reverse-pitch) propeller which may be operated in beta mode for ground reversing or taxis operation. As a result, the propeller blades (reference 110 in FIG. 3) may be moved toward reverse pitch, as discussed above, and a negative blade angle can be allowed to produce a reducing thrust in the aircraft. As the blade angle decreases, the feedback wheel 104 then begins moving axially forward (in the direction of arrow B in FIG. 3) at the low blade angle setting. Forward movement continues until reaching reverse pitch stop. At blade angles higher than the low blade angle setting, the feedback wheel 104 remains stationary.

During axial displacement of the feedback wheel 104, the sensor 112 is successively exposed to different sections of the singularities 102, the different sections being taken along the direction E. As illustrated in FIG. 4, the sensor 112 is indeed in a first position 124*a* relative to the feedback wheel 104 prior to the propeller entering the reverse mode of operation (e.g. before the feedback wheel 104 begins axial movement). In this position 124*a*, the sensor 112 is adjacent a lower edge $126_L$ of the feedback wheel 104 is exposed to and can accordingly detect the passage of the lower end portion $128_L$ of the angled tooth $102_B$. As the propeller 30 enters the reverse mode of operation and the blade angle is decreased, the feedback wheel 104 is gradually displaced along axis A in the direction of arrow B. When the propeller is in the full reverse condition, the feedback wheel 104 has been fully axially displaced and reaches the position illustrated in solid lines in FIG. 6 (with the original position of the feedback wheel 104 being shown in dashed lines). As a result, the sensor 112 is in a second position 124*b* relative to the displaced feedback wheel 104. In this position 124*b*, the sensor 112 is adjacent to an upper edge $126_U$ of the feedback wheel 104 such that the sensor 112 is exposed to and can accordingly detect the passage of the upper end portion $128_U$ of the angled tooth $102_B$.

As can be seen from FIG. 4 and FIG. 6, due to the angled configuration of the tooth $102_B$, the lower end portion $128_L$ is positioned forward (when taken in the direction of rotation illustrated by arrow F) of the upper end portion $128_U$. As such, when the feedback wheel 104 is in the initial position with the sensor 112 in position 124a relative to the feedback wheel 104, the sensor 112 detects the passing of the tooth $102_B$ (e.g. the lower end $128_L$ thereof) earlier (i.e. in less time) than when the feedback wheel 104 is fully displaced with the sensor 112 in position 124b relative to the feedback wheel 104 and the sensor 112 detects the passing of the tooth $102_B$ (e.g. the upper end $128_U$ thereof). As a result, the time taken by the sensor 112 to detect the passing of the tooth $102_B$ varies as the feedback wheel 104 is displaced axially in the direction of arrow B. Still, since the teeth $102_A$, $102_C$ are not angled but all extend along the direction E, as the feedback wheel 104 moves, the sensor 112 detects passing of each one of the teeth $102_A$, $102_C$ at the same time, regardless of whether the sensor is in position 124a or position 124b.

Therefore, as can be seen in FIG. 5, the timeframes Tm and Ts are varied as the feedback wheel 104 moves axially along the propeller system and the position of the sensor 112 relative to the feedback wheel 104 varies. In particular and as discussed above, as the direction of rotation (arrow F in FIG. 4) increases, the section or area of the tooth $102_B$ observed by the sensor 112 is gradually displaced along the direction E of FIG. 4 and more rearward (relative to direction of arrow F) tooth sections are observed until the most rearward section, e.g. the upper end $128_U$, is detected. Accordingly, the area of the tooth $102_B$ observed by the sensor 112 is gradually moved rearward (as illustrated by arrow G), i.e. from the lower (and most forward) end $128_L$ being detected at first to the upper (and most rearward) end $128_U$ being detected at last, and tooth sections in between being successively detected by the sensor 112. Therefore, the time interval Tm is increased and the time interval Ts decreased. This in turn alters the spacing relationship between Tm (timeframe between detection by sensor 112 of teeth $102_A$ and $102_B$) and Ts (timeframe between detection by sensor 112 of teeth $102_B$ and $102_C$).

The relationship between the beta (blade angle) position and the measured values of Tm and Ts is then given by:

$$\text{Beta position} = (Ts - Tm)/(Ts + Tm) \quad (1)$$

The detection unit 116 can then apply equation (1) to compute the blade angle position for the propeller (reference 30 in FIG. 3) and accordingly the axial position of the propeller system. The detection unit 116 can further detect axial movement of the feedback wheel 104 by detecting a change in the spatial relationship between Ts and Tm. This could be done by comparing current values of Ts and Tm to previous values stored in memory and detecting the change in spatial relationship upon detecting a difference in the values.

In addition to beta position, the detection unit 116 can electronically decode the sensor's output voltage signal to provide the propeller's rotational speed. Indeed, the rotational speed can be computed on the basis of the sum of the timeframe values (Tm+Ts) and the number of singularities $102_A$, $102_B$, $102_C$, using known computation methods. Propeller synchrophasing and synchronization for multi-engine (e.g. twin engine) aircrafts and other applications may further be implemented by removing one or more of the singularities $102_A$, $102_B$, $102_C$ from the beta feedback wheel 104 to permit missing tooth pulse detection capability in the engine control electronics. It should be understood that either one of the singularities 102, i.e. one of the first teeth as in $102_A$, $102_B$ or one angled teeth as in $102_B$, may be removed from the feedback wheel 104 to perform missing tooth detection. In particular, the angled tooth $102_B$ may be removed such that a gap is created between successive first teeth $102_A$. Detection of the missing tooth may then provide a special timing position signal. When several engines are provided in the aircraft, the timing position signal can then be used to keep the engines operating at the same revolutions per minute (RPM) and the propeller blades in phase with one another. As a result of such synchrophasing and synchronizing, noise and vibration can be reduced.

Figure 7:
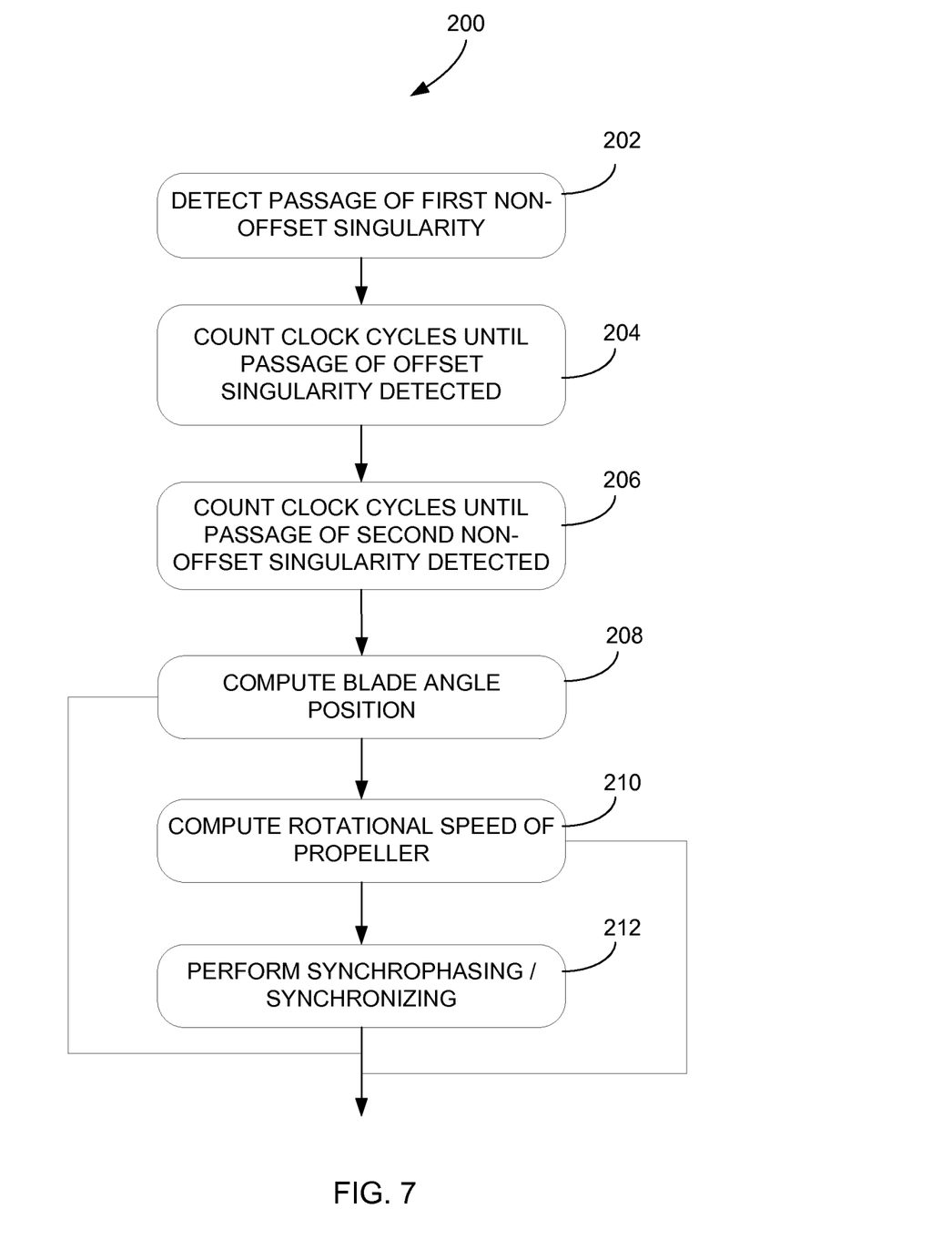
FIG. 7 is a flowchart of a method for electronic beta feedback detection, in accordance with an illustrative embodiment.

FIG. 7 illustrates a method 200 for electronic beta feedback. The method 200 comprises detecting the passage of a first non-offset singularity at step 202. The next step 204 is then to count the clock cycles until the passage of an offset singularity is detected. The clock cycles until detection of the passage of a second non-offset singularity may then be counted at step 206. Detection may be performed using a suitable sensor, such as a sensor as in 112 arranged on a beta feedback wheel as discussed herein above with reference to FIG. 2, with the non-offset and offset singularities arranged as discussed herein above with reference to FIG. 4. The next step 208 may then be to compute the blade angle position on the basis of the counted clock cycles, e.g. by applying equation (1) discussed herein above. As discussed above, the rotation speed of the propeller may also be computed at step 210 using knowledge of the counted clock cycles and the number of singularities and propeller synchrophasing and synchronization may also be performed at step 212 by applying missing tooth detection.

The above description is meant to be exemplary only, and one skilled in the art will recognize that changes may be made to the embodiments described without departing from the scope of the invention disclosed. For example, the annular member may be stationary and the sensor may rotate. In another example, the sensor and annular member may be operative in connection with another suitable rotating component of the engine indicative of propeller rotation. Relative axial movement between sensor(s) and the annular member may be accomplished in any suitable fashion. Still other modifications which fall within the scope of the present invention will be apparent to those skilled in the art, in light of a review of this disclosure, and such modifications are intended to fall within the appended claims.

The invention claimed is:

1. A blade angle position feedback system for an aircraft propeller, the propeller rotatable about an axis and comprising a plurality of blades each rotatable through a plurality of blade angles, the propeller having at least a first mode of operation where the plurality of blades are operated at a positive blade angle and a second mode of operation where the plurality of blades are operated at a negative blade angle, the system comprising:

an annular member operatively connected to rotate with the propeller, the annular member comprising at least two circumferentially-spaced first singularities extending substantially parallel to the axis and at least one second singularity extending non-parallel to the first singularities;

at least one sensor fixedly mounted adjacent the annular member, the at least one sensor configured for successively detecting a passage of each one of the at least two first singularities and the at least one second singularity as the annular member is rotated and axially displaced and for generating a sensor signal accordingly, the annular member and at least one sensor configured for relative axial displacement between a first relative axial position and a second relative axial position, the first position corresponding to the first mode of operation and the second position corresponding to the second mode of operation; and a detection unit connected to the at least one sensor for receiving the sensor signal therefrom, determining, by a processor, on the basis of the sensor signal a time interval elapsed between the passage of successive ones of the at least two first singularities and the at least one second singularity, and computing, by the processor, from the time interval a blade angle position for the plurality of blades.

2. The system of claim 1, wherein the annular member is mounted for axial displacement relative to a fixedly-mounted at least one sensor.

3. The system of claim 1, wherein each of the at least one second singularity is positioned between two consecutive ones of the at least two first singularities.

4. The system of claim 3, wherein the detection unit is for computing a first time interval Tm between the passage of a first one of the at least two first singularities and the passage of a first one of the at least one second singularity, computing a second time interval Ts between the passage of the first one of the at least one second singularity and the passage of a second one of the at least two first singularities, the first one of the at least one second singularity positioned between the first one and the second one of the at least two first singularities, and computing the blade angle position as: Blade angle position =(Ts−Tm)/(Ts+Tm).

5. The system of claim 4, wherein the annular member is rotatable about the axis and axially displaceable therealong for exposing different portions of the at least one second singularity to the at least one sensor, the annular member, when in the first position, exposing a forward portion of the at least one second singularity to the at least one sensor, when in the second position, exposing a rearward portion of the at least one second singularity to the at least one sensor, and, when transitioning between the first and the second position exposing successive portions of the at least one second singularity provided between the forward and the rearward portion.

6. The system of claim 5, wherein, as the annular member is rotated and axially displaced between the first and the second position, a time at which the at least one sensor detects a given one of the portions of the at least one second singularity is different from a time at which the at least one sensor detects a subsequent one of the portions of the at least one second singularity, such that the first and the second time intervals computed by the detection unit further to detection of a first passage of the at least two first singularities and the at least one second singularity differ from the first and the second time intervals computed by the detection unit further to detection of a subsequent passage of the at least two first singularities and the at least one second singularity.

7. The system of claim 4, further comprising a memory having stored therein data indicative of a number of the at least two first singularities and the at least one second singularity provided on the annular member, wherein the detection unit is configured to retrieve the data from the memory, to compute a sum of the first time interval and the second time interval and to determine a rotation speed of the propeller on the basis of the number of singularities and of the sum.

8. The system of claim 1, wherein the at least one sensor is configured to detect a missing one of the singularities removed from the annular member and to accordingly generate the sensor signal indicative of detection of the missing singularity, the detection unit configured to synchronize the propeller of a first engine with the propeller of at least one second engine on the basis of the sensor signal.

9. The system of claim 1, wherein the singularities are on an internal face of the annular member and the at least one sensor is mounted adjacent the internal face.

10. The system of claim 1, wherein the singularities are on an outer face of the annular member and the at least one sensor is mounted adjacent the outer face.

11. The system of claim 1, wherein the at least two first singularities and the at least one second singularity are selected from a group consisting of a projecting tooth extending away from the annular member and a slot formed in the annular member.

12. The system of claim 1, wherein the at least one sensor comprises a first sensor diametrically opposite to a second sensor.

13. An aircraft propeller system comprising:
a propeller having a plurality of blades each rotatable from a positive blade angle to a negative blade angle;
an annular member comprising circumferentially-spaced first singularities each extending generally parallel and at least a second singularity extending non-parallel to the first singularities;
a sensor adjacent the annular member and configured for detecting said singularities passing the sensor, the annular member and sensor slidingly mounted with respect to one another between first and second relative axial positions, one of the annular member and sensor mounted for rotation with the propeller and the other fixedly mounted to the engine; and
a detection unit connected to the sensor and configured for computing, by a processor, a blade angle position based elapsed time between detected singularities.

14. The system of claim 13, wherein said movement of the annular member is exposing different portions of the singularities to the sensor, the first and second singularities arranged to have different relative spacings therebetween at the sensor location depending on axial position of the annular member.

15. The system of claim 13, wherein the singularities are selected from a group consisting of a projecting tooth and a slot formed in the annular member.

16. A method for blade angle position feedback for an aircraft propeller, the propeller rotatable about an axis and comprising a plurality of blades each rotatable through a plurality of blade angles, the propeller having at least a first mode of operation where the plurality of blades are operated at a positive blade angle and a second mode of operation where the plurality of blades are operated at a negative blade angle, the method comprising:
receiving a sensor signal from at least one sensor fixedly mounted adjacent an annular member operatively connected to rotate with the propeller, the annular member comprising at least two circumferentially-spaced first singularities extending substantially parallel to the axis and at least one second singularity extending non-parallel to the first singularities, the at least one sensor configured for successively detecting a passage of each one of the at least two first singularities and the at least one second singularity as the annular member is rotated and axially displaced and for generating a sensor signal accordingly, the annular member and at least one sensor configured for relative axial displacement between a first relative axial position and a second relative axial position, the first position corresponding to the first mode of operation and the second position corresponding to the second mode of operation;

determining, by a processor, on the basis of the sensor signal a time interval elapsed between the passage of successive ones of the at least two first singularities and the at least one second singularity; and computing, by the processor, from the time interval a blade angle position for the plurality of blades.

17. The method of claim 16, wherein determining the time interval comprises computing a first time interval Tm between the passage of a first one of the at least two first singularities and the passage of a first one of the at least one second singularity and computing a second time interval Ts between the passage of the first one of the at least one second singularity and the passage of a second one of the at least two first singularities, the first one of the at least one second singularity positioned between the first one and the second one of the at least two first singularities, and further wherein the blade angle position is computed as: Blade angle position=(Ts−Tm)/(Ts+Tm).

18. The method of claim 17, wherein movement of the annular member causes a time at which the at least one sensor detects a given one of the portions of the at least one second singularity to differ from a time at which the at least one sensor detects a subsequent one of the portions of the at least one second singularity, and further wherein the first and the second time intervals computed further to detection of a first passage of the at least two first singularities and the at least one second singularity differ from the first and the second time intervals computed further to detection of a subsequent passage of the at least two first singularities and the at least one second singularity.

19. The method of claim 16, further comprising retrieving from a memory data indicative of a number of the singularities, computing a sum of the first time interval and the second time interval and determining a rotation speed of the propeller on the basis of the number of singularities and of the sum.

20. The method of claim 16, further comprising detecting a missing one of the singularities removed from the annular member, accordingly generating the sensor signal indicative of detection of the missing singularity, and synchronizing the propeller of a first engine with the propeller of at least one second engine on the basis of the sensor signal.

* * * * *